Figure 1:
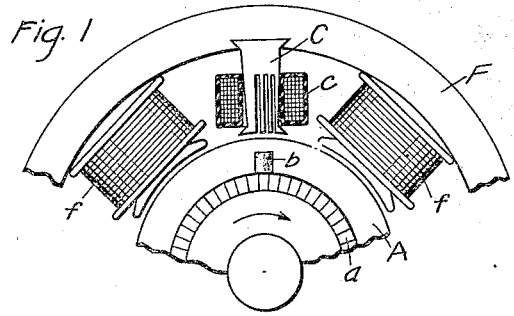

K. SULZBERGER.
COMMUTATING DYNAMO ELECTRIC MACHINE.
APPLICATION FILED JAN. 16, 1906.

907,891.

Patented Dec. 29, 1908.

Witnesses:

Inventor;
Karl Sulzberger
By Albert G. Davis
Atty.

UNITED STATES PATENT OFFICE.

KARL SULZBERGER, OF CHARLOTTENBURG, GERMANY, ASSIGNOR TO GENERAL ELECTRIC COMPANY, A CORPORATION OF NEW YORK.

COMMUTATING DYNAMO-ELECTRIC MACHINE.

No. 907,891.  Specification of Letters Patent.  Patented Dec. 29, 1908.

Application filed January 16, 1906. Serial No. 296,334.

*To all whom it may concern:*

Be it known that I, KARL SULZBERGER, a citizen of Switzerland, residing at Charlottenburg, Germany, have invented certain new and useful Improvements in Commutating Dynamo-Electric Machines, of which the following is a specification.

My invention relates to commutating poles for dynamo-electric machines.

It has been proposed heretofore, for the purpose of improving commutation in dynamo-electric machines, to employ a commutating pole or lug, placed between the main field coils of the machine, and energized by a coil in series with the armature connected to produce a flux in the commutating pole of the proper amount and direction for reversing the current in a coil short-circuited by a brush in commutation. Since the coil on the commutating pole is in series with the armature, the commutating field obtained is proportional to the armature current for all loads, which is the desired relation for proper commutation.

I have discovered that the best results are obtained with commutating poles which do not produce a field of uniform strength over their pole-face, but that for best commutation in a generator a coil should enter a strong field when it passes under the commutating pole, and that this field should become weaker toward the side on which the coil leaves the pole. In a motor in which the direction of rotation for a given direction of current-flow through the armature is opposite to the direction of rotation for a generator, the coil should enter a weak field and the field should become stronger toward the side on which the coil leaves the pole. If the variation in field-strength across the face of the pole in a circumferential direction is properly adjusted, much better commutation is obtained than with a commutating pole which gives a uniform field across its entire pole-face. I have also discovered that it is advantageous so to arrange the commutating pole as to offer a high reluctance to a flux passing through the commutating pole from one side to the other due to the current in an armature conductor beneath the pole, since such an arrangement gives a low reactance to a coil undergoing commutation beneath the pole. By properly slotting the commutating pole, both the variation in field-strength and the high reluctance to a flux passing through the pole may be obtained.

My invention, accordingly, consists in arranging the commutating poles with slots in axial planes; the slots being dissymmetrical with respect to the axial plane passing through the middle of the pole.

My invention will best be understood by reference to the accompanying drawings, in which—

Figure 2:
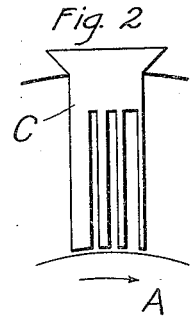
Figure 3:
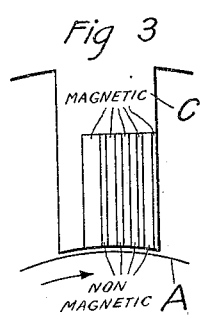
Figure 4:
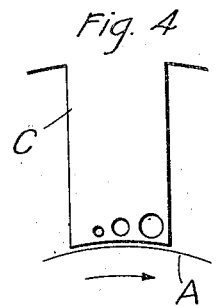

Figure 1 shows somewhat diagrammatically a dynamo-electric machine provided with a commutating pole arranged in accordance with my invention; and Figs. 2 to 4 show modifications in the construction of the commutating pole.

In Fig. 1, F represents the field structure provided with the usual field coils $f$. A represents the armature provided with a commutator $a$ and commutator brushes $b$. C represents a commutating pole placed midway between the main field poles of the machine, carrying and energized by the coil $c$, which in practice is connected in series with the armature in the usual manner. The pole C, instead of being symmetrical with respect to the armature, has its magnetic material cut away in such manner that it presents a stronger field on its left-hand side as viewed in Fig. 1, than on its right-hand side. The armature in this figure is supposed to be rotating in a clockwise direction, as indicated by the arrow which shows the direction of rotation for a generator, so that a coil approaching the commutating pole enters a strong field which grows gradually weaker as the coil advances across the pole-face; this variation of field-strength, as heretofore explained, producing greatly improved commutation.

In order to produce the dissymmetry of the arrangement of the magnetic material of the commutating pole with respect to the axial plane and passing through the middle of the pole, it may be slotted as shown in Fig. 1, the slots being more closely spaced toward one side of the pole than toward the other. These slots serve an additional purpose in offering a high reluctance to a flux passing through the commutating pole from one side to the other due to an armature conductor beneath the pole-face, and consequently decrease the reactance of a coil beneath the pole undergoing commutation.

Instead of employing uniform slots unevenly spaced, as in Fig. 1, I may employ slots increasing in size toward one side of the pole, as shown in Fig. 2, or in place of axially slotting out the pole I may build up one side of the pole of interleaved slabs of magnetic and non-magnetic material, as shown in Fig. 3. In this figure a block is set into one side of the commutating pole C composed of slabs of magnetic material alternating with non-magnetic slabs. By varying the thickness of either or both of said slabs the field-strength across the pole-face may be varied.

Instead of the open slots shown in Figs. 1 and 2, closed slots or holes, as shown in Fig. 4, may be employed. Other suitable arrangements for cutting away the magnetic material on one side of the pole so as to produce the required dissymmetry will readily occur to those skilled in the art.

Although I have shown my invention in Fig. 1 applied to a machine of the usual type having projecting poles, my invention is equally applicable to machines of the type described in Patent No. 741,234, Deri, dated October 13, 1903, in which no projecting poles are employed, but in which the magnetic material is distributed substantially uniformly around the armature, and in which the commutating pole may more aptly be termed a lug than a pole. Consequently I do not desire to limit myself to the particular construction and arrangement of parts here shown, but aim in the appended claims to cover all modifications which are within the scope of my invention.

What I claim as new and desire to secure by Letters Patent of the United States, is,—

1. In a dynamo-electric machine, a field magnet, an armature provided with a commutator, and a commutating pole or lug slotted in axial planes, the slots being dissymmetrical with respect to the axial plane through the middle of the pole.

2. In a dynamo-electric machine, a field magnet, an armature provided with a commutator, and a commutating pole or lug slotted in axial planes, the slots being arranged to cut away a greater amount of magnetic material on the side of the pole on which the armature conductors leave the pole than on the other side.

3. In a dynamo-electric machine, a field magnet, an armature provided with a commutator, and a commutating pole or lug slotted in axial planes, the slots being arranged to cut away unequal amounts of magnetic material on opposite sides of the axial plane passing through the middle of the pole.

In witness whereof, I have hereunto set my hand this twenty-ninth day of December, 1905.

KARL SULZBERGER.

Witnesses:
JULIUS RUMLAND,
MAX HAMBURGER.